May 23, 1950　　　　　　J. R. SNYDER　　　　　2,508,626
AIRPLANE FUEL TANK FUELING DEVICE
Filed Nov. 19, 1943　　　　　　　　　　　3 Sheets-Sheet 1
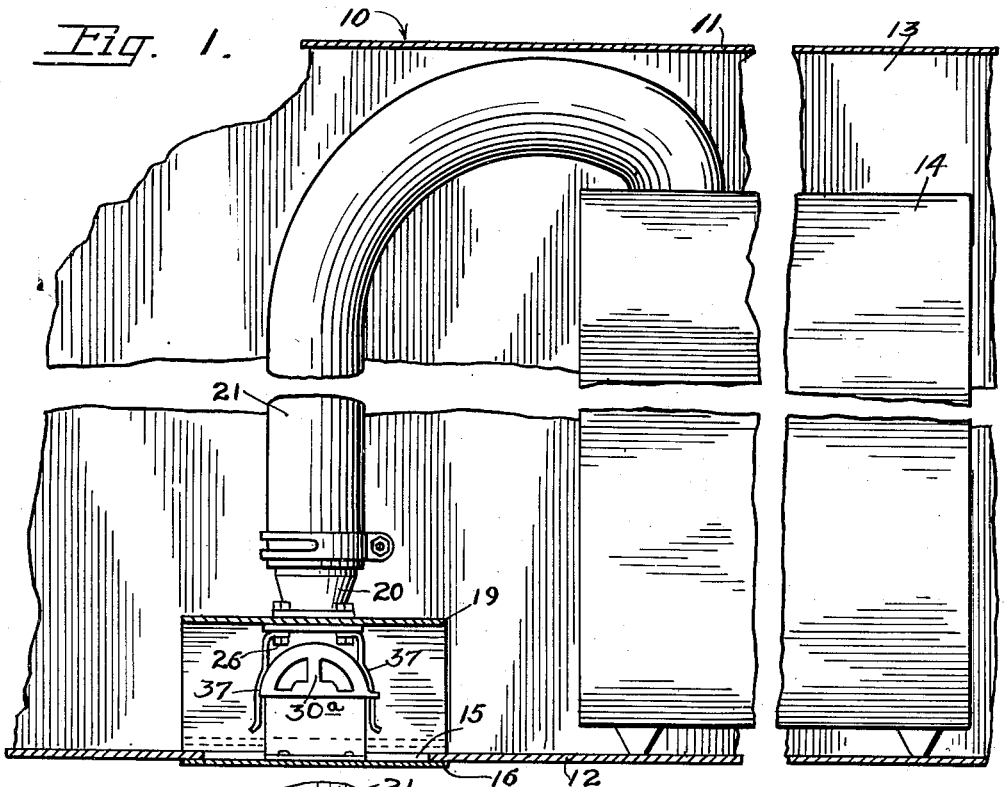
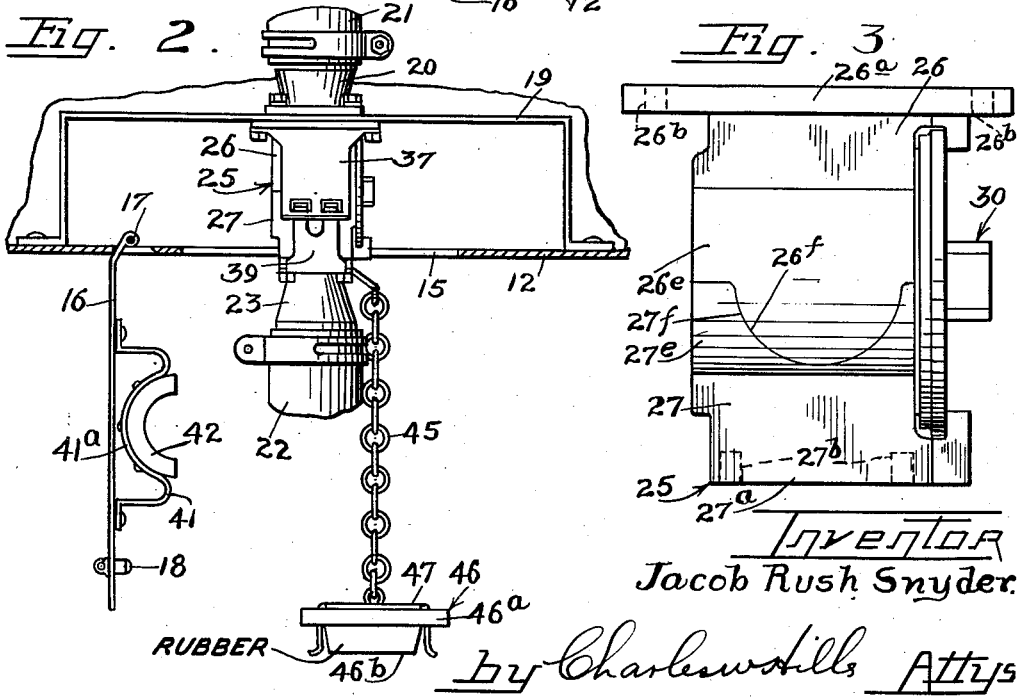
Inventor
Jacob Rush Snyder.
by Charles W. Hills Attys May 23, 1950 J. R. SNYDER 2,508,626
AIRPLANE FUEL TANK FUELING DEVICE
Filed Nov. 19, 1943 3 Sheets-Sheet 2
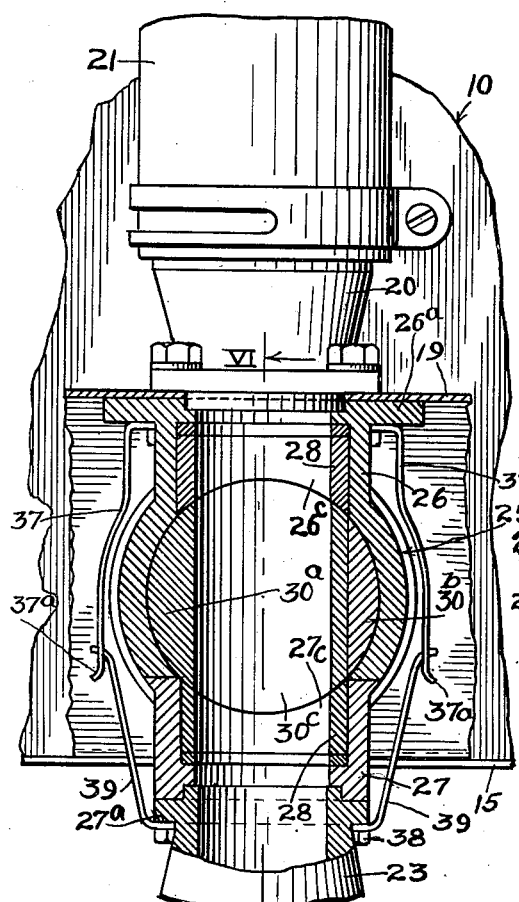
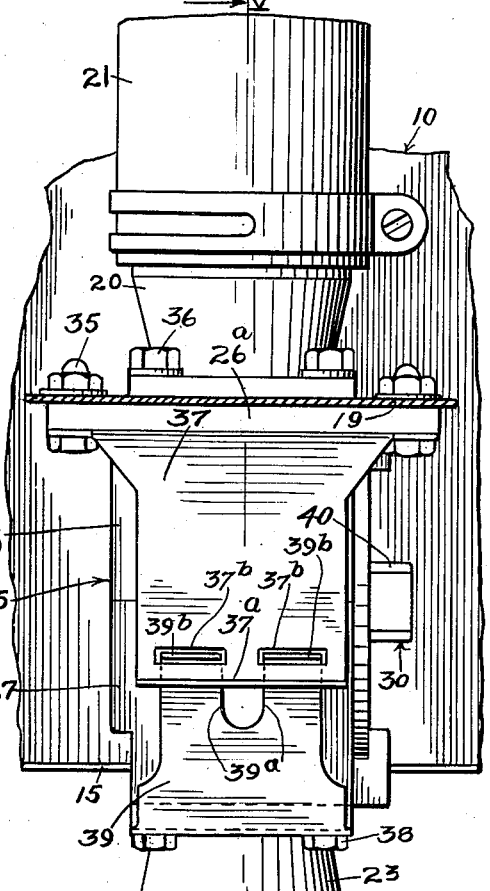
Inventor
Jacob Rush Snyder.
by Charles W. Hill Attys

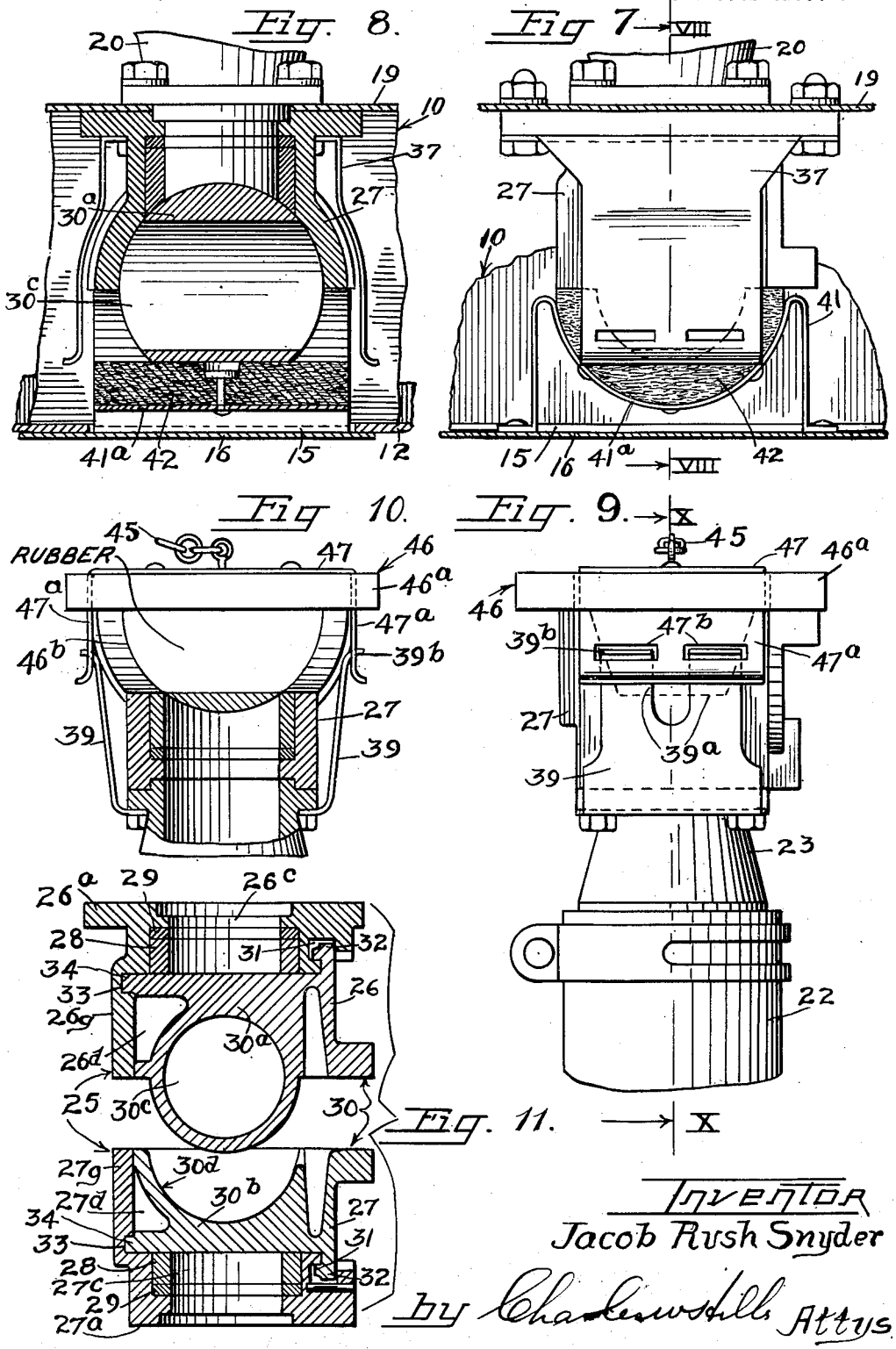

Patented May 23, 1950

2,508,626

UNITED STATES PATENT OFFICE 2,508,626

AIRPLANE FUEL TANK FUELING DEVICE

Jacob Rush Snyder, Cleveland, Ohio, assignor to Thompson Products, Inc., Cleveland, Ohio, a corporation of Ohio Application November 19, 1943, Serial No. 510,895

6 Claims. (Cl. 244—135)

This invention relates to a device for quickly and safely charging vehicle fuel tanks such as airplane fuel tanks.

Specifically the invention deals with a device for charging the wing tanks of airplanes without the necessity for climbing on top of the wing.

While the invention will be hereinafter specifically described as embodied in an airplane wing and wing tank assembly, it should be understood that the invention is not limited to such usage, since it is generally useful for the charging of any type of container in any vehicle or on stationary supports.

In accordance with this invention, an airplane wing having spaced upper and lower walls or skins and a fuel tank therein between the walls or skins is provided with a charging door in the lower wall or skin of the wing. A bracket is mounted in the wing to bridge the door opening and this bracket fixedly carries a coupling box with a valve part therein sealing the box. A conduit joins the coupling box with the top end of the tank. A mating coupling box is mounted on the end of a charging conduit such as a hose from a gasoline truck and this box also has a valve part therein sealing the box to prevent leakage out of the hose. Each of the coupling boxes carries interfitting spring fingers so that, when the charging door is open and the coupling box on the charging hose moved into assembling position with the wing-carried coupling box, the spring fingers will interlock to detachably connect the boxes. The valve parts in each box are interfitting and rotate in the mated-together boxes as a unit for not only joining the boxes in fluid flow communication but also detachably connecting the boxes and preventing leakage therebetween. A quarter turn rotation of the valve parts from their box-sealing positions will move them to position for connecting the boxes in fluid flow communication. The charging hose is, therefore, in fluid flow communication with the conduit leading to the top of the tank, and the tank is thus adapted to be readily filled through the lower wall or the wing without the necessity for climbing on top of the wing to reach the usual top tank-charging port.

The closure for the opening in the lower wall of the wing preferably carries a protective covering member for the wing-mounted coupling box to partially receive the end of the box and protect this end against damage as well as keep it sealed from dirt. The coupling box on the charging hose likewise has the end face thereof protected by a covering member or plug equipped with spring fingers for detachable locking with the spring fingers on this box.

It is, then, an object of this invention to provide a quick and safe charging device.

A further object of the invention is to provide a device for charging airplane wing tanks through the lower wing wall or skin to avoid the necessity for climbing on top of the wing for the tank-charging operation.

A still further object of the invention is to provide a safety fuel-charging device for vehicle fuel tanks wherein the vehicle carries a fixed coupling part adapted to cooperate with a complementary coupling part on a charging conduit and wherein each of the coupling parts contain valve members sealing the parts when disconnected and joining the parts in connected fluid flow relation.

A still further object of the invention is to provide a fuel-charging assembly for vehicles wherein complementary coupling boxes are snapped into substantial connecting relationship prior to actual connection thereof.

A still further object of the invention is to provide a charging device for vehicles wherein a vehicle-mounted coupling detachably retains a charging conduit coupling through snap action and holds the charging conduit coupling in position for the final coupling operation.

Other and further objects of the invention will be apparent to those skilled in the art from the following detailed description of the annexed sheets of drawings which, by way of preferred example only, illustrate one embodiment of the invention.

On the drawings:

Figure 1 is a broken fragmentary vertical cross-sectional view of an airplane wing and wing tank equipped with a charging device according to this invention.

Figure 2 is a fragmentary side elevational view, with a part in vertical cross section, of the charging device of this invention mounted in coupling position.

Figure 3 is a side elevational view of the coupling used in the charging device of this invention.

Figure 4 is an enlarged view similar to Figure 2.

Figure 5 is a vertical cross-sectional view, with parts in elevation, taken along the line V—V of Figure 4.

Figure 6 is a vertical cross-sectional view taken along the line VI—VI of Figure 5.

Figure 7 is a side elevational view of the airplane mounted coupling part illustrating the manner in which the end of this part is protected by a covering member on the charging door of the airplane wing.

Figure 8 is a vertical cross-sectional view along the line VIII—VIII of Figure 7.

Figure 9 is a side elevational view of the coupling part on the charging conduit illustrating the manner in which the end of this part is protected by a covering member.

Figure 10 is a vertical cross-sectional view, with parts in elevation, taken along the line X—X of Figure 9.

Figure 11 is a longitudinal cross-sectional view taken through the coupling parts illustrating the positions of the valve members when the parts are in sealed disconnected relation.

As shown on the drawings:

In Figure 1 the reference numeral 10 designates generally the wing of an airplane having a top wall or skin 11 and a bottom wall or skin 12 providing a space 13 therebetween in which is mounted a fuel tank 14. The lower wall 12 has an opening 15 therein closed by a charging door 16. As illustrated in Figure 2, the charging door 16 may have a hinge connection 17 with the wall 12 and may be equipped with a locking fastener 18 to hold the door in closed position substantially flush with the lower wing wall 12.

A strap or bracket 19 is mounted in the space 13 of the wing on the bottom wall 12 to bridge the opening 15. A conduit fitting 20 is mounted on the top wall of the bracket 19 and receives the end of a conduit 21 extending through the space 13 into the top of the tank 14.

As shown in Figure 2, a charging conduit 22, which may be in the form of a hose from a gasoline supply truck (not shown), has a fitting 23 mounted on the end thereof.

In accordance with this invention the conduits 21 and 22 are sealed whenever the same are in disconnected relation and are coupled together in fluid flow relation by means of a quick disconnect coupling 25 best shown in Figures 3, 6 and 11. The quick disconnect coupling 25 is composed of a first coupling part or box 26 and a second coupling part or box 27. As shown in Figure 3, the box 26 has an end flange 26a with bolt-receiving apertures 26b therethrough while the box 27 has an end face 27a with tapped internally threaded bolt-receiving holes 27b extending inwardly therefrom. The holes 26b and 27b serve for mounting the box 26 on the top wall of the strap 19 and for mounting the box 27 on the fitting 23 as will be more fully hereinafter described.

As shown in Figures 6 and 11, the box 26 has a port 26c extending inwardly from the flanged end 26a thereof to an open topped flat bottomed segmental cylindrical chamber 26d having the axis thereof at right angles to the axis of the port. Similarly the box 27 has a port 27c extending from the end face 27a thereof to a flat bottomed segmental cylindrical chamber 27d having the axis thereof at right angles to the axis of the port. Seal rings 28 are slidably mounted in the ports 26c and 27c and are backed by resilient rings 29 urging the seal rings toward the chambers 26d and 27d.

As shown in Figure 3, the box 26 has a segmental cylindrical side wall 26e with a semi-circular projecting tongue portion 26f while the box 27 has a similar segmental cylindrical side wall 27e with a segmental circular recess 27f for receiving the tongue 26f. Similar side walls are provided on the opposite sides of the boxes 26 and 27. As indicated in Figures 3, 6 and 11, the boxes 26 and 27 have flat bottom walls 26g and 27g respectively adapted to be abutted together when the boxes are brought into mating relation for being coupled together.

The boxes, when brought together in mating relation, thus define an open-topped closed-bottomed cylindrical chamber, and this chamber rotatably supports a two-piece cylindrical plug or valve 30. The plug 30 has one piece 30a thereof rotatably carried in the box 26 and the other piece 30b thereof rotatably carried in the box 27. The piece 30a defines a cylindrical passageway 30c for connecting the ports 26c and 27c of the boxes while the piece 30b has a segmental cylindrical recess 30d for receiving the projecting wall of the piece 30a which partially defines the passageway 30c.

The boxes around the mouth of the cylindrical chamber defined thereby have a circular track-forming groove 31 receiving semi-cylindrical flanges 32 on each plug piece 30a and 30b. The bottoms 26c and 27g of the boxes likewise have semi-circular grooves 33 therein receiving semi-circular rim ends 34 on the plug pieces. When the coupling parts are in disconnected relation, as shown in Figure 11, the flanges 32 and 34 of the plug piece 30a are disposed entirely within the grooves 31 and 33 of the coupling box 26 while the corresponding flanges on the valve piece 30b are completely disposed in the grooves 31 and 33 of the coupling box 27 so that the plug pieces are retained in their respective boxes. In this position of the plug pieces, the cylindrical side walls thereof close the ports 26c and 27c and are acted upon by the seals 28 to seal these ports as shown in Figure 11.

When the boxes 26 and 27 are brought together in mating relation and the valve 30 rotated 90° to the position shown in Figure 6, the cylindrical passageway 30c connects the ports 26c and 27c in full fluid flow communication while the flanges 32 and rim ends 33 of both valve pieces are disposed in the grooves 31 and 33 of both coupling boxes to connect the boxes. Thus the multi-piece plug or valve is operative to not only seal the ports of the boxes when the boxes are disconnected but is also operative to connect the boxes in fluid flow communication. As shown in Figures 4 and 5, the flange 26a of the coupling box 26 is mounted under the top wall of the strap 19 and bolts 35 are passed through the holes in the flange and through this top wall of the strap to suspend the box from the strap. Bolts 36 secure the fitting 20 to the strap and flange.

The bolts 35 also carry opposed spring fingers or plates 37 straddling the cylindrical side walls of the boxes 26 and 27 in spaced relation therefrom and terminating in outturned end flanges 37a at a level above the lower wing opening 15. A pair of elongated horizontally extending apertures 37b are provided in each spring plate or finger 37 in spaced relation above the outturned flanges 37a thereof.

Bolts 38 connect the fitting 23 to the coupling box 27 and are threaded into the holes 27b of this coupling box. These same bolts 38 also support opposed spring fingers or plates 39 straddling the cylindrical side wall of the box 27. Each plate or finger 39 has a pair of spaced spring legs or arms 39a at the free ends thereof terminating in outturned flanges 39b for seating in the slots or apertures 37b of the spring fingers 37. The arms or legs 39a are adapted to underlie the fingers 37 and be guided by the outturned flanges 37a of these fingers into such underlying position.

As the coupling box 27, with the fingers 39 thereon, is moved into mating position with the coupling box 26 the fingers 39 will be moved under the fingers 37 and the arms or legs 39a will have the flanged ends 39b thereof automatically snapped into the apertures or slots 37b thereby suspending the coupling box 27 in substantial mating relation with the coupling box 26 and facilitating the coupling operation.

With the coupling box 27 suspended from the box 26, it is a simple matter to rotate the plug or valve 30 for connecting the boxes in fluid flow communication. The plug or valve 30 has a boss or lug 40 projecting through the open tops of the coupling boxes which is readily adapted to be engaged by a wrench for rotating the valve into position for uniting the boxes and for opening the ports thereof to connect the conduits 21 and 22 in full fluid flow communication.

As shown in Figures 2, 7 and 8, the closure 16 for the wing opening 15 carries a bracket 41 having a semi-cylindrical depression 41a in the middle thereof receiving a semi-cylindrical felt washer or pad 42. When the box 27 is uncoupled from the box 26 and the closure 16 is swung to closed position, the felt pad 42 will receive the projecting cylindrical wall of the valve or plug piece 30a defining the passageway 30c and will abut the end of the coupling box to protect the valve piece and coupling box. This protective covering is desirable to prevent damage to the coupling box and valve piece.

As shown in Figures 2, 9 and 10, the coupling box 27 has a chain 45 secured thereon carrying a rubber plug 46. This plug 46 includes a rectangular base portion 46a and a soft segmental cylindrical portion 46b for fitting into the recess 30d of the valve piece 30b. The base 46a is adapted to overlie and cover the open end face of the coupling box 27.

A metal plate 47 overlies the base 46a and has end portions 47a projecting through the base to straddle the cylindrical portion 46b. These end portions provide spring fingers and are apertured or slotted as at 47b to receive the outturned flanges 39b of the arms or legs 39a on the fingers 39 carried by the coupling box 27. Thus the plug 46 is adapted to be retained over the end of the coupling box 27 for protecting the coupling box.

From the above descriptions it will be understood that this invention provides for the filling of airplane wing tanks with fuel through the bottom wing skin or wall, thereby obviating the necessity for climbing on top of the wing to charge the tanks. The wing structure carries a self-sealing coupling part and means for readily suspending a complemenetary self-sealing coupling part on a fuel-charging hose. The coupling parts not only seal the ends of hoses or conduits on which they are mounted, but also automatically join these ends in full fluid flow communication whenever the parts are coupled together. Thus, in charging a fuel tank according to this invention, it is merely necessary to swing open the closure door 16 on the lower wall or skin of the wing, lift the end of the charging hose through this opening to snap-fit the coupling boxes together for immediately suspending the hose on wing structure. It is then a simple matter to rotate the valve of the coupling parts for connecting the parts in flow communication.

The fittings 29 and 21 on the hoses or conduits can converge as shown to provide tapered Venturi-like throats for metering down the flow of fuel from large diameter hoses or conduits to the diameter of the ports in the coupling parts, thereby preventing any turbulence of fluid at the coupling. After the fuel tank has been charged, it is merely necessary to rotate the plug or valve of the coupling to disconnect position, thereby automatically sealing the conduits and disconnecting the coupling parts. The spring fingers 37 can readily be spread or the spring fingers 39 can readily be contracted to permit separation of the suspended part 27 from the wing-carried part 26.

By having the conduit 21 communicate with the top of the tank 14 as shown in Figure 1, the coupling part 26 is not subjected to the pressure of the head of fuel in the tank 14. However, this top-filling arrangement can readily be replaced with a bottom-filling arrangement if desired.

After the charging operation, and the removal of the coupling part 27 from the part 26, the closure 16 is swung to closed position and the felt pad 42 automatically covers the coupling part 26 and the valve piece therein for protecting the same. The plug 46 can then be snapped over the coupling part 27 to protect this part and the valve piece therein.

Since the coupling parts cannot be disconnected unless they are sealed, leakage of fuel is eliminated. The fuel-charging device of this invention therefore not only speeds up the procedure for charging fuel tanks, but also greatly increases the safety of this procedure in that fire hazards due to leakage are avoided.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A charging device for a tank mounted on an airplane which comprises a first coupling part fixedly mounted on the airplane in communication with a tank of the airplane, a second coupling part for mounting on the end of a charging conduit, multi-apertured resilient skirt means on one of said coupling parts and spring fingers on the other of said coupling parts engageable in the apertures of said skirt means for suspending said second coupling part on said first coupling part in substantial mating relation therewith, and a multi-piece valve rotatably supported in the coupling parts for uniting said parts in fluid flow communication and for sealing the parts in disconnected relation.

2. In a charging device, a coupling part, a valve piece rotatably mounted in said coupling part to seal the part, spring fingers straddling the sides of the coupling part, a soft resilient plug contoured to conform to the exposed surface of said valve piece, and spring fingers on said plug cooperating with the spring fingers on the coupling part for detachably connecting the plug and valve piece.

3. In combination, a first coupling part, spring fingers on said first coupling part straddling the side walls thereof, said spring fingers having slots adjacent the free ends thereof, a second coupling part, and spring fingers straddling the side walls of said second coupling part having outturned free end portions adapted to seat in the slots of the spring fingers on the first coupling part whereby positioning of the coupling parts into mating relation will automatically position the spring fingers in connected relation to detachably connect the parts.

4. A charging device for a vehicle tank comprising a first coupling part fixedly mounted on a vehicle adjacent the bottom of the tank to be charged, a first conduit connecting the coupling part with the upper portion of the tank, a second coupling part for mounting on the end of a second conduit, means on the first coupling part for suspending the second coupling part and second conduit on the vehicle, and a multi-piece plug valve having a piece rotatably retained in each coupling part for sealing the coupling parts, said valve having means thereon for connecting the first and second coupling parts in fluid flow communication to join the first and second conduits.

5. In combination, a tank, conduit means having an end portion communicating with said tank, and means for fixedly positioning the other end portion of said conduit at a level below the top of said tank for filling said tank by upward flow through said conduit means, said other conduit end portion comprising a first coupling part, a first valve part in said first coupling part for sealing said conduit means, a second coupling part adapted for connection to a charging conduit, a second valve part in said second coupling part adapted for sealing said charging conduit, means respectively carried by said first and second coupling parts for detachably holding said coupling parts together in mating position, said first and second valve parts cooperating to form a valve unit when said coupling parts are held together in mating position to control flow from said charging conduit through said conduit means into said tank, said positioning means being rigidly connected to said other end portion of said conduit means only at said first coupling part to make possible detachment of said two coupling parts, said second coupling part being supported at a level below said first coupling part from said positioning means through said first coupling part and said holding means carried by said two coupling parts, and said positioning means being arranged to permit access for said charging conduit to said second coupling part from below whereby said tank can be filled from said charging conduit by upward flow through said conduit means under the control of said valve unit.

6. In combination, a tank, conduit means having an end portion communicating with said tank, and housing means enclosing said tank and conduit means formed with a bottom aperture for making possible filling of said tank from below and provided with a bracket bridging said aperture for positioning the other end portion of said conduit at a level below the top of said tank for filling said tank by upward flow through said conduit means, said other conduit end portion comprising a first coupling part, a first valve part in said first coupling part for sealing said conduit means, a second coupling part adapted for connection to a charging conduit, a second valve part in said second coupling part adapted for sealing said charging conduit, means respectively carried by said first and second coupling parts for detachably holding said coupling parts together in mating position, said first and second valve parts cooperating to form a valve unit when said coupling parts are held together in mating position to control flow from said charging conduit through said conduit means into said tank, said bracket being rigidly connected to said other end portion of said conduit means only at said first coupling part to make possible detachment of said two coupling parts, said second coupling part being supported at a level below said first coupling part from said bracket through said first coupling part and said holding means carried by said two coupling parts, said bottom aperture being arranged to permit access for said charging conduit to said second coupling part from below whereby said tank can be filled from said charging conduit by upward flow through said conduit means under the control of said valve unit, and closure means for said bottom aperture swingably connected to said housing means.

JACOB RUSH SNYDER.

REFERENCES CITED

The following references are of record in the file of this patent:

UNITED STATES PATENTS

| Number | Name | Date |
| --- | --- | --- |
| 193,174 | Moss | July 17, 1877 |
| 416,767 | Walker | Dec. 10, 1889 |
| 799,394 | Lynch | Sept. 12, 1905 |
| 909,131 | Antic | Jan. 12, 1909 |
| 1,441,967 | Cowel | Jan. 9, 1923 |
| 1,806,833 | Ullendorff | May 26, 1931 |
| 2,199,588 | Cobham et al. | May 7, 1940 |
| 2,234,393 | Amiot | Mar. 11, 1941 |
| 2,326,143 | Hufferd | Aug. 10, 1943 |
| 2,327,654 | McIntosh | Aug. 24, 1943 |
| 2,333,496 | Townhill | Nov. 2, 1943 |
| 2,354,069 | Shields | July 18, 1944 |
| 2,357,232 | Snyder et al. | Aug. 29, 1944 |
| 2,373,925 | Townhill | Apr. 17, 1945 |
| 2,411,149 | Dodson | Nov. 19, 1946 |
| 2,416,637 | Minella | Feb. 25, 1947 |
| 2,445,802 | Robinson | July 27, 1948 |